United States Patent [19]

Hill

[11] Patent Number: 4,709,961
[45] Date of Patent: Dec. 1, 1987

[54] SELF-RELEASING RATCHET-TYPE SEAT ADJUSTMENT

[75] Inventor: Kevin E. Hill, Milwaukee, Wis.

[73] Assignee: Milsco Manufacturing Company, Milwaukee, Wis.

[21] Appl. No.: 912,495

[22] Filed: Sep. 29, 1986

[51] Int. Cl.$^4$ ............................ A47C 3/00; A47C 7/46
[52] U.S. Cl. .................................... 297/284; 297/313; 297/356
[58] Field of Search ............... 297/313, 284, 331, 335, 297/336, 356

[56] References Cited

U.S. PATENT DOCUMENTS

| | | | |
|---|---|---|---|
| 773,720 | 11/1904 | Drury | 297/356 X |
| 970,635 | 9/1910 | Matthes | 297/356 X |
| 2,120,156 | 6/1938 | Simpson | 297/356 X |
| 4,589,696 | 5/1986 | Kanai et al. | 297/284 |
| 4,621,864 | 11/1986 | Hill | 297/356 X |

Primary Examiner—Kenneth J. Dorner
Assistant Examiner—Peter R. Brown
Attorney, Agent, or Firm—James E. Nilles; James R. Custin

[57] ABSTRACT

In the self-releasing pawl and ratchet mechanism of this invention, for controlling positions of adjustment of a seat element that is movable relative to a frame element, one member of the pawl-ratchet pair is fixed to one of those elements, the other member is confined to movement relative to the other element in directions transverse to the directions of adjustment of the seat element. A latch for locking the pawl and ratchet members out of engagement with one another is carried by the element that carries the movable member of the pawl-ratchet pair and is actuated in the adjustment directions, between latching and release positions, by a lost motion connection with the other element. In its release position the latch is disengaged from the movable member of the pawl-ratchet pair. In its latching position, wherein it is releasably retained, as by friction, the latch holds that movable member in a ratchet disengaged position.

4 Claims, 11 Drawing Figures

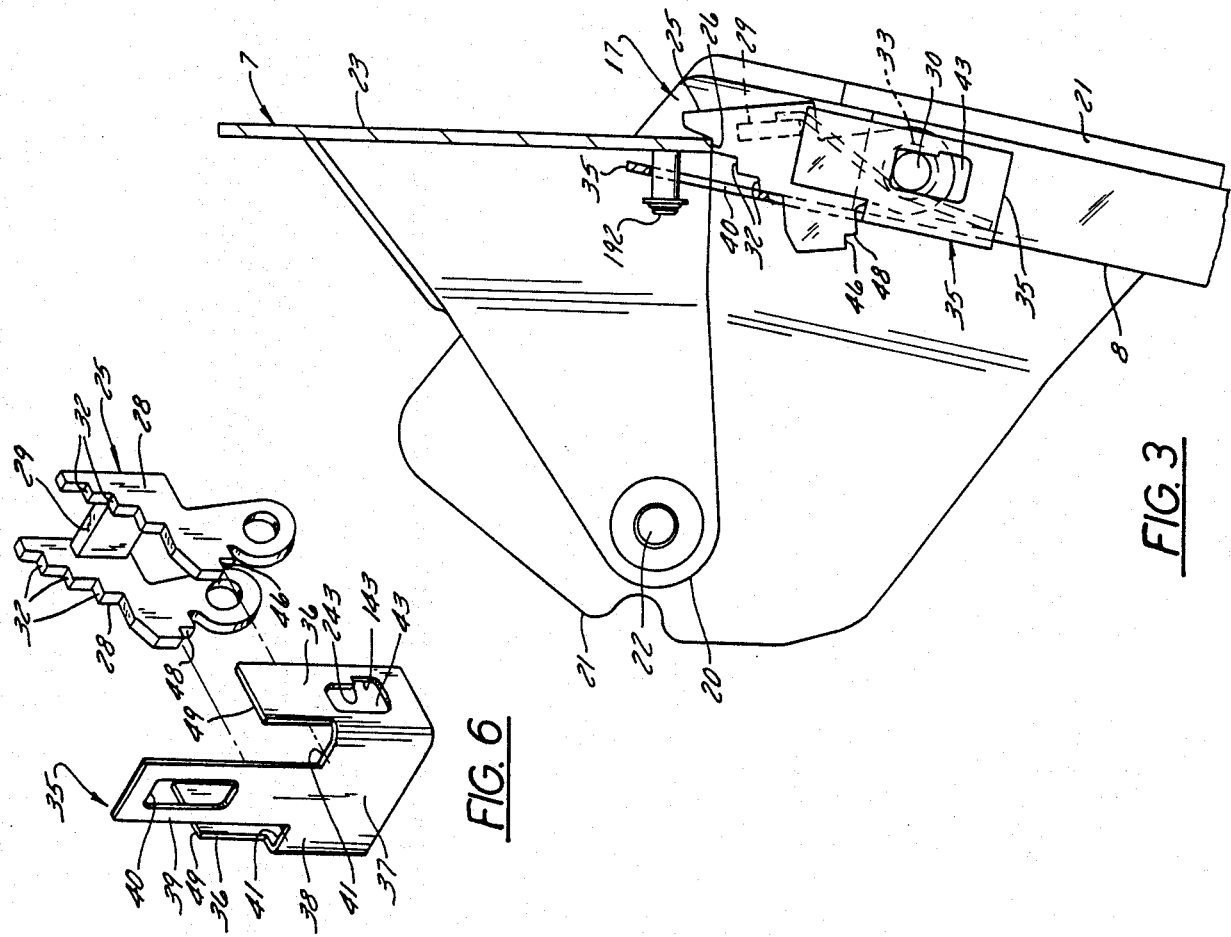
FIG. 3
FIG. 6
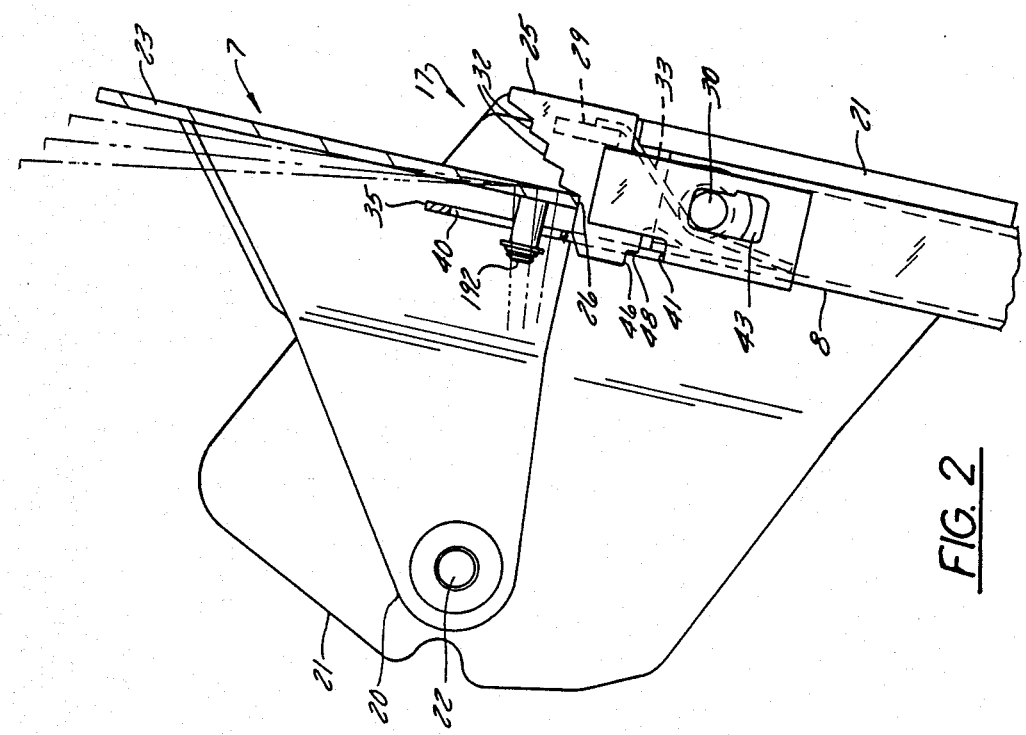
FIG. 2

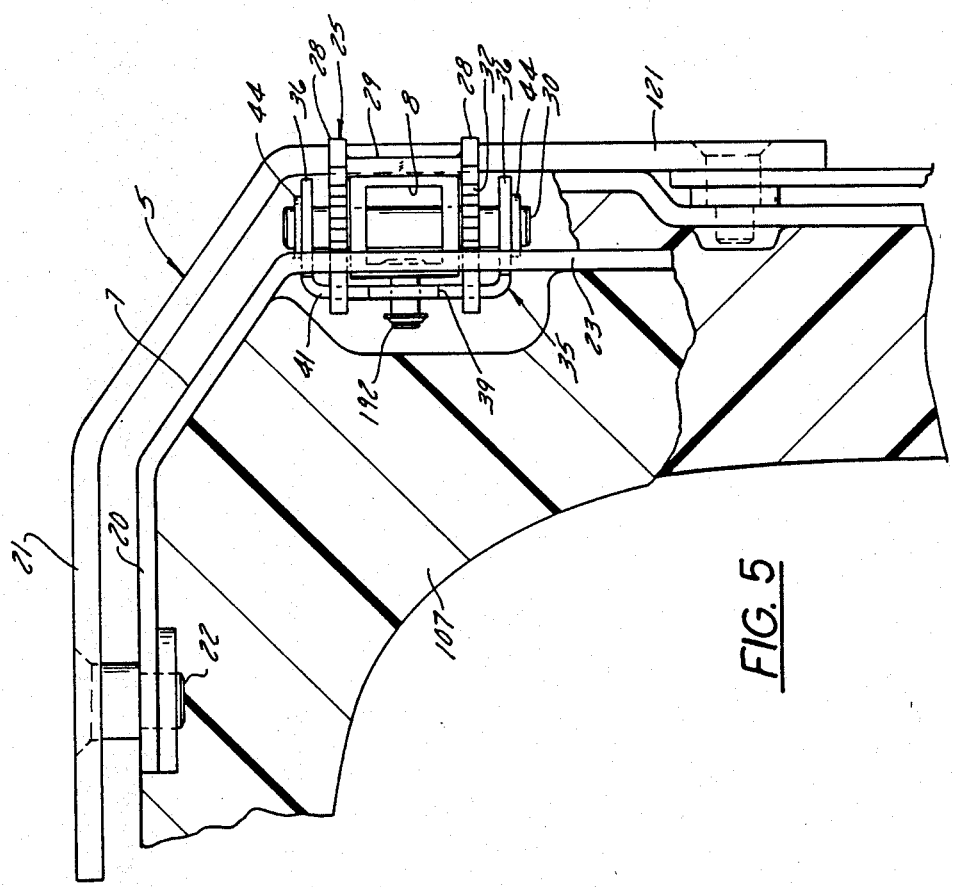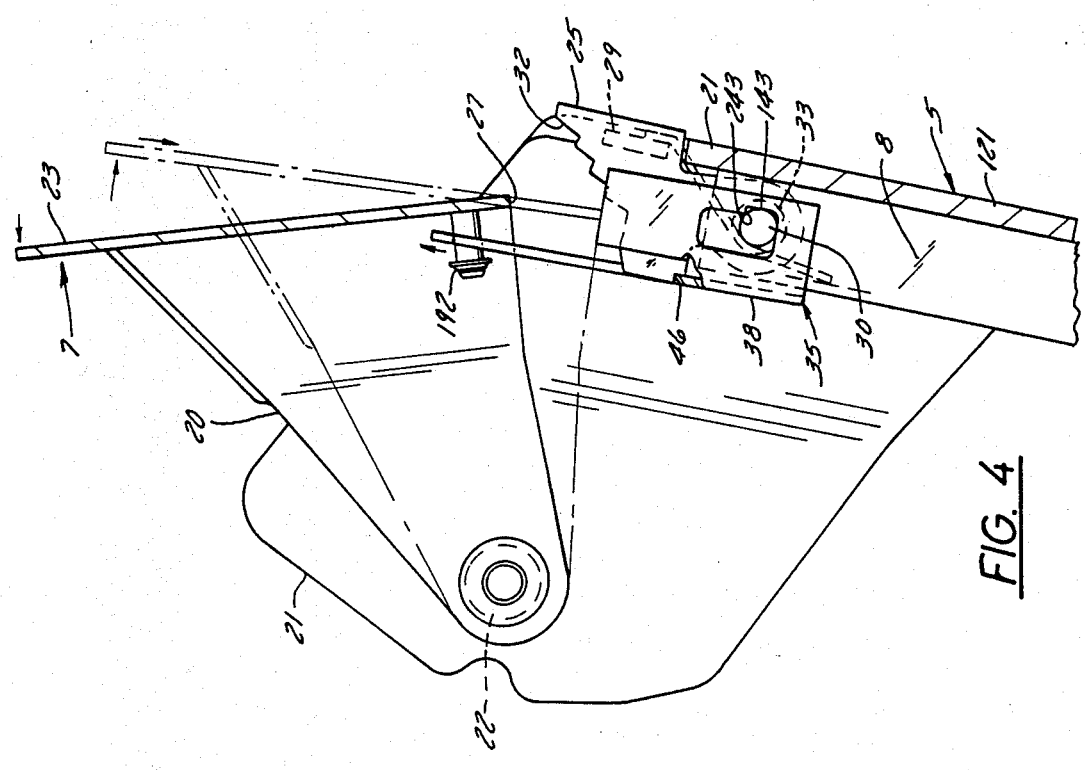

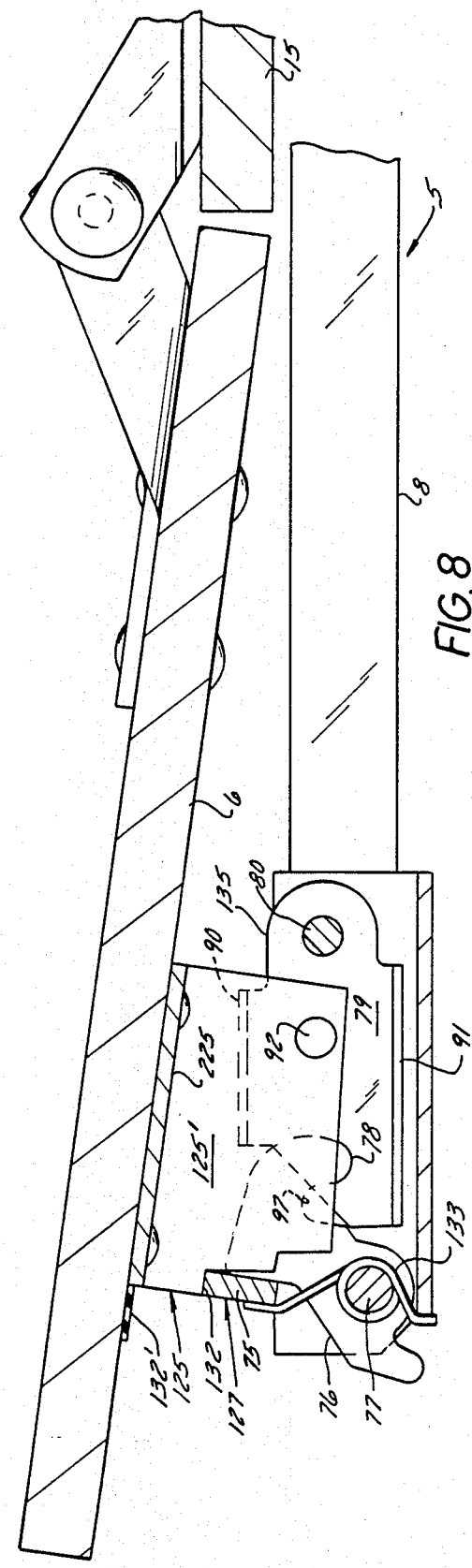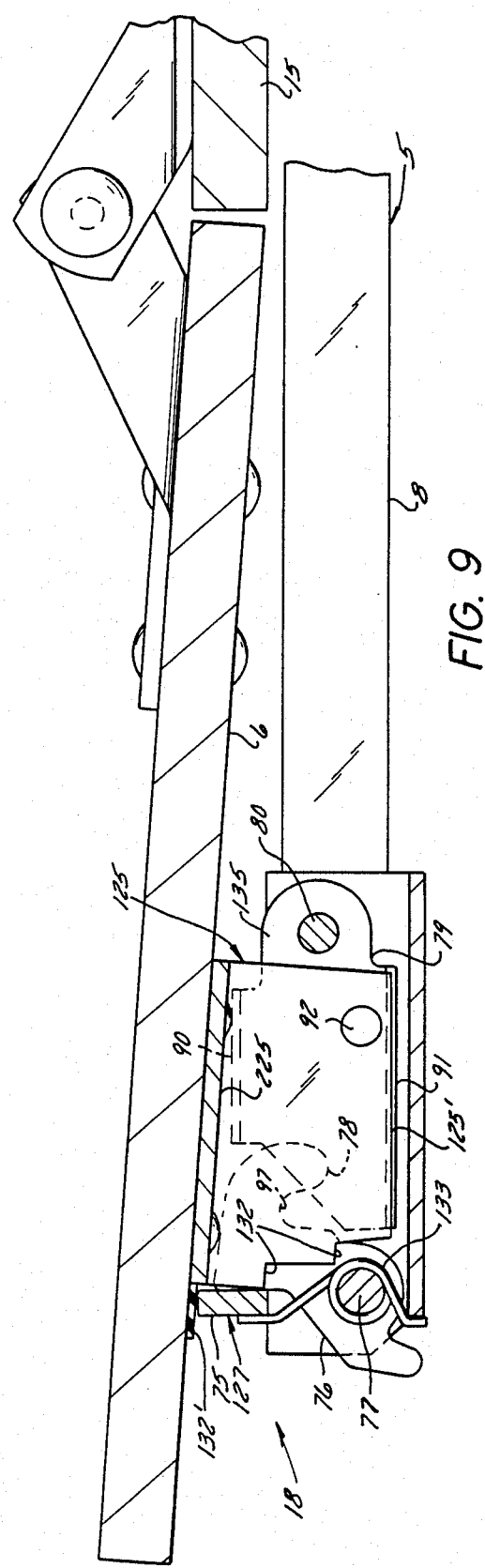

SELF-RELEASING RATCHET-TYPE SEAT ADJUSTMENT

FIELD OF THE INVENTION

This invention relates to a vehicle seat that has a relatively stationary frame element and has a seat element such as a back rest or a seat pan that is movable relative to the frame element in a pair of opposite adjusting directions and is normally biased in one of those directions by an occupant of the seat who receives support from that seat element; and the invention is more particularly concerned with an adjusting mechanism for such a seat element, of the type comprising a pawl and a ratchet which are normally engaged to hold the seat element against movement in that one direction out of each of a plurality of positions to which it can be moved in the opposite direction, and further comprising means for disengaging the pawl and the ratchet upon movement of the seat element all the way in said opposite direction to one limit, so that the seat element can then move substantially freely in said one direction to another limit from which it can again be moved to each of said positions. The invention thus relates to a seat adjustment ratchet mechanism of the type that can be termed self-releasing.

BACKGROUND OF THE INVENTION

A self-releasing ratchet mechanism is a particularly desirable adjustment device for a vehicle seat element because of its ease and simplicity of operation. For example, if such a mechanism controls the position of fore-and-aft tilting of a back rest, the seat occupant need only reach over his shoulder and pull the back rest forward until its attitude is satisfactory. If an attempted adjustment tilts it too far to the front, it need only be swung all the way to the front limit of its adjusting motion, whereupon it can be swung freely to the rear limit of such motion for forward adjustment through its whole range. Thus the seat element simply responds to direct actuation, and therefore the seat is more likely to be adjusted to the occupant's comfort than would be the case with a knob or lever that the occupant must first find and then fiddle with. Easy adjustment of a vehicle operator's seat is more than a mere matter of convenience; the operator should be comfortable for safe operation of the vehicle.

Numerous self-releasing ratchet mechanisms are known that are intended for controlling positioning of an adjustable element of a seat, but each of these has some disadvantage that makes it unsuitable for certain vehicle seat applications. In particular, no fully satisfactory mechanism of this type has been devised for an installation in which a seat element that is to be controlled is adjustingly tiltable about a relatively fixed axis extending from side to side of the seat, and wherein it is important that the mechanism be as compact as possible in the directions of adjusting motion of that seat element, that it not rattle under relatively severe vibration and that it not be damaged or thrown out of a selected position of adjustment by an abrupt acceleration in any direction.

The prior patents discussed below disclose self-releasing ratchet mechanisms that were satisfactory for the purposes for which they were intended but which had disadvantages for an installation of the type just described.

U.S. Pat. No. 4,307,913 to Speigelhoff, which is assigned to the assignee of this application, discloses a self-releasing ratchet mechanism that provides for vertical adjustment of a horizontally elongated arm rest of a vehicle seat. It comprises a pawl member, a ratchet member and a latch member, each of which is movable relative to the seat frame and the arm rest as well as relative to the other members, so that there are numerous moving parts. The mechanism is relatively large in the directions of adjusting motions of the arm rest and is therefore not suitable where there is limited space in the adjustment directions.

A self-releasing ratchet mechanism for a back rest that is edgewise vertically adjustable is disclosed in U.S. patent application Ser. No. 774,447, filed Sept. 10, 1985, now U.S. Pat. No. 4,639,039, which has a common assignee with this application. That mechanism is relatively very slender in the front-to-back direction, but it is suitable only for an edgewise adjustable element and not suitable for controlling a backrest that is adjustably tiltable fore-and-aft or a seat pan that is tiltable up and down.

U.S. Pat. Nos. 4,451,084 to Seeley and 4,370,898 to Maruyama disclose self-releasing ratchet mechanisms that similarly lack compactness in the adjusting directions. In each of these, the pawl that cooperates with the position-defining ratchet is connected with an overcenter tension spring that tends to hold the pawl in each of an operative position and an inoperative position between which it can be alternatively flipped with a toggling action. This spring necessarily extends lengthwise in substantially the directions of adjustment so that the mechanism is not well suited for a tiltable back rest or seat pan structure that is shallow in the directions of its adjusting motion.

The relatively old U.S. Pat. Nos. 773,720 to Drury and 970,635 to Matthhews, disclose self-releasing ratchet mechanisms for controlling swinging adjustment of a seat element. Although fairly compact and simple, these mechanisms are suitable essentially only for the articles of furniture (couches and cnairs) for which they are expressly intended, and they would not be satisfactory for a vehicle seat, which must securely maintain its position of adjustment under vibration that may be severe and under widely and abruptly varying loads.

The mechanism disclosed by Matthes, like some of the other prior self-releasing ratchet mechanisms, has the important disadvantage that it cannot be readily adjusted through its full range by a person who remains seated in the seat in which it is incorporated. The reason for this is that after the adjustable element of the seat has been brought to its last defined position of adjustment in the direction in which the engaged pawl and ratchet permit movement of that element, that element must be moved through a further, rather substantial distance in the same direction to bring it to a limit position at which the pawl and ratchet are latched out of engagement with one another to permit free movement of that element in the opposite direction. Thus, if such a prior mechanism controls adjustment of a tiltingly adjustable seat pan, a person sitting on that seat pan who has brought it to its highest position of adjustment, and who wants to release it for adjustment to a lower position, must further raise it to a substantial extent, in awkward opposition to his own weight, in order to release it for lowering.

The arrangement disclosed by Drury illustrates another feature of some prior self-releasing ratchet mechanisms that made them unsuitable for vehicle seats. In that arrangement friction was relied upon to constrain a latch member to move with the adjustable seat element between one position in which the latch member captivated the pawl to maintain it temporarily clear of the ratchet and another position in which the latch released the pawl for re-engagement with the ratchet. The frictional connection provided for a certain amount of relative motion between the frictionally connected parts, needed for effecting captivation and release of the pawl. A vehicle seat mechanism is subjected to vibration and other forces and tends to be exposed to dust and dirt; therefore a frictional connection between two parts of a vehicle seat is an inherently unreliable expedient for constraining one of those parts to move with the other at some times but permitting it to move relative to the other at other times.

In the arrangements disclosed in most of the above mentioned prior patents, an extension spring was employed for maintaining the pawl member and the ratchet member of the pawl and ratchet mechanism in biased engagement with one another. Such a spring has hooks at its opposite ends, one of which is connected to the biased member of the pawl and ratchet mechanism and the other of which is connected to an element of the seat structure. A sharp blow against the seat structure can disconnect one of the spring hooks, necessitating a certain amount of disassembly of the seat for access to the spring so that its detached hook can be reconnected. As indicated above, an extension spring often has the further disadvantage that it must extend lengthwise in a direction in which compactness is particularly desired.

SUMMARY OF THE INVENTION

The general object of this invention is to provide an adjustment mechanism for a seat element which is movable in opposite adjustment directions relative to a frame element, said adjustment mechanism being of the self-releasing ratchet type and being compact in said adjustment directions so as to be well suited for cooperation with a seat pan element that is adjustable up and down or a back rest element that is adjustable fore and aft, especially where such adjustments involve tilting or swinging of the adjustable element.

Another and very important object of this invention is to provide a self-releasing pawl and ratchet mechanism for a seat element which is movable in a pair of opposite adjustment directions and which is normally urged in one of those directions by a seat occupant who receives support from it, said mechanism being arranged to hold the seat element against movement in that one direction out of each of a plurality of defined positions to which the seat element can be moved in the opposite direction and which are spaced apart at substantially uniform increments of the adjusting motion, and said mechanism being releasable for substantially free motion of the seat element in said one direction in consequence of its being moved in said opposite direction through only a small distance beyond the last of the defined positions in that opposite direction.

It is also an object of this invention to provide a self-releasing pawl and ratchet adjustment mechanism that is particularly suitable for a vehicle seat by reason of its being so arranged that friction is relied upon only to hold parts of the mechanism in a transitory relationship whereby the pawl and ratchet are kept disengaged from one another and wherein the frictionally engaged parts are stationary with respect to one another, friction between them being maintained under a force exerted by the same biasing means that otherwise maintains the pawl and ratchet in engagement with one another.

Another object of this invention is to provide a self-releasing ratchet-type seat adjustment device of the character described which is particularly suitable for a seat pan that is tiltingly adjustable up and down or a back rest that is tiltingly adjustable fore and aft, and which meets the special requirements for vehicle seat adjustment mechanisms in that it is very compact but is nonetheless sturdy and reliable, being capable of maintaining the adjustable seat element in any selected position of its adjustment even though large acceleration and vibration forces may be imposed upon it.

A specific object of this invention is to provide an adjustment mechanism of the character described that is well suited for a vehicle seat by reason of its relatively moving parts being arranged to avoid rattling against one another, such parts being either spaced from one another or engaged with one another under a firm biasing force.

Another specific object is to provide a self-releasing ratchet type adjustment mechanism for a seat comprising a relatively stationary frame element and a seat element that is movable in opposite adjustment directions relative to the frame element, said adjustment mechanism comprising a pawl and a ratchet, one of which is a relatively fixed member that is fixed to one of said elements, the other being a relatively movable member carried by the other of said elements and confined to swinging motion relative to it transversely to said adjustment directions, the relatively movable member being biased into ratcheting engagement with the relatively fixed member by means of a compact torsion spring that preferably surrounds a shaft on which the relatively movable member is mounted for its swinging motion.

These and other objects of the invention that will appear as the description proceeds are achieved in the adjustment means of this invention, which is particularly intended for a seat comprising a relatively stationary frame element and a seat element that is swingable relative to the frame element in a pair of opposite adjustment directions between a pair of defined limits and which is normally urged in one of said directions by its support of an occupant of the seat. The adjustment means of this invention comprises ratcheting members consisting of a ratchet member cooperable with a pawl member for holding said seat element against swinging in said one direction out of each of a plurality of defined adjustment positions to which it can be swung in the opposite adjustment direction. Said adjustment means further comprises a latch member that cooperates with said ratchet means to provide for substantially free movement of the seat element in said one adjustment direction to one of said limits in consequence of its being swung in said opposite direction to the other of said limits. The adjustment means of this invention is characterized in that one of said members of the ratchet means is fixed to one of said elements; and the other of said members of the ratchet means is confined to movement relative to the other of said elements in opposite ratcheting directions towards and from said one member that are substantially transverse to said adjustment directions, and is biased in the ratcheting direction towards said one member for ratcheting engagement therewith.

The latch member is carried by said other of said elements and is confined to motion relative thereto substantially in said adjustment directions between defined latching and release positions. The latch member and said one of said elements have cooperating abutments defining a lost motion connection between them whereby the latch member is moved to a latching position and to a release position, respectively, by movement of the seat element to its said one limit and to its said other limit. There are cooperating driving surfaces on the latch member and on said other member of the ratchet means which are spaced apart when the latch member is in its release position but are engaged during motion of the latch member to its latching position, and through which the latch member, by that motion, drives said other member of the ratchet means to a disabled position in which it is spaced from said one member of the ratchet means. Cooperating latch member restraining means on the latch member and on a part carried by said other of said elements is arranged to be disengaged when the latch member is out of its latching position but to be engaged under the bias on said other member of the ratchet means when the latch member is in its releasing position, and, when engaged, to restrain the latch member against movement out of its latching position while the latch member retains said other member of the ratcheting means in its disabled position.

BRIEF DESCRIPTION OF DRAWINGS

In the accompanying drawings, which illustrate what are now regarded as preferred embodiments of the invention:

FIG. 2 is a fragmentary view in side elevation of the adjustment means for the back rest element, shown in its most rearwardly tilted position;

FIG. 3 is a view generally similar to FIG. 2 but showing the back rest in its most forward position of tilting adjustment;

FIG. 4 is a view generally similar to FIGS. 2 and 3 but showing the latch member of the adjustment means in its latching position;

FIG. 5 is a fragmentary top view of the back rest and its adjustment means;

FIG. 6 is a perspective view of the ratchet member and latch member of the back rest adjustment means in disassembled relation to one another;

FIG. 8 is a view generally similar to FIG. 7 but showing the seat pan element in an intermediate position of adjustment:

FIG. 9 is a view like FIG. 8 but showing the seat pan element in its lowest position of adjustment;

DETAILED DESCRIPTION OF PREFERRED EMBODIMENTS OF THE INVENTION

Figure 1:
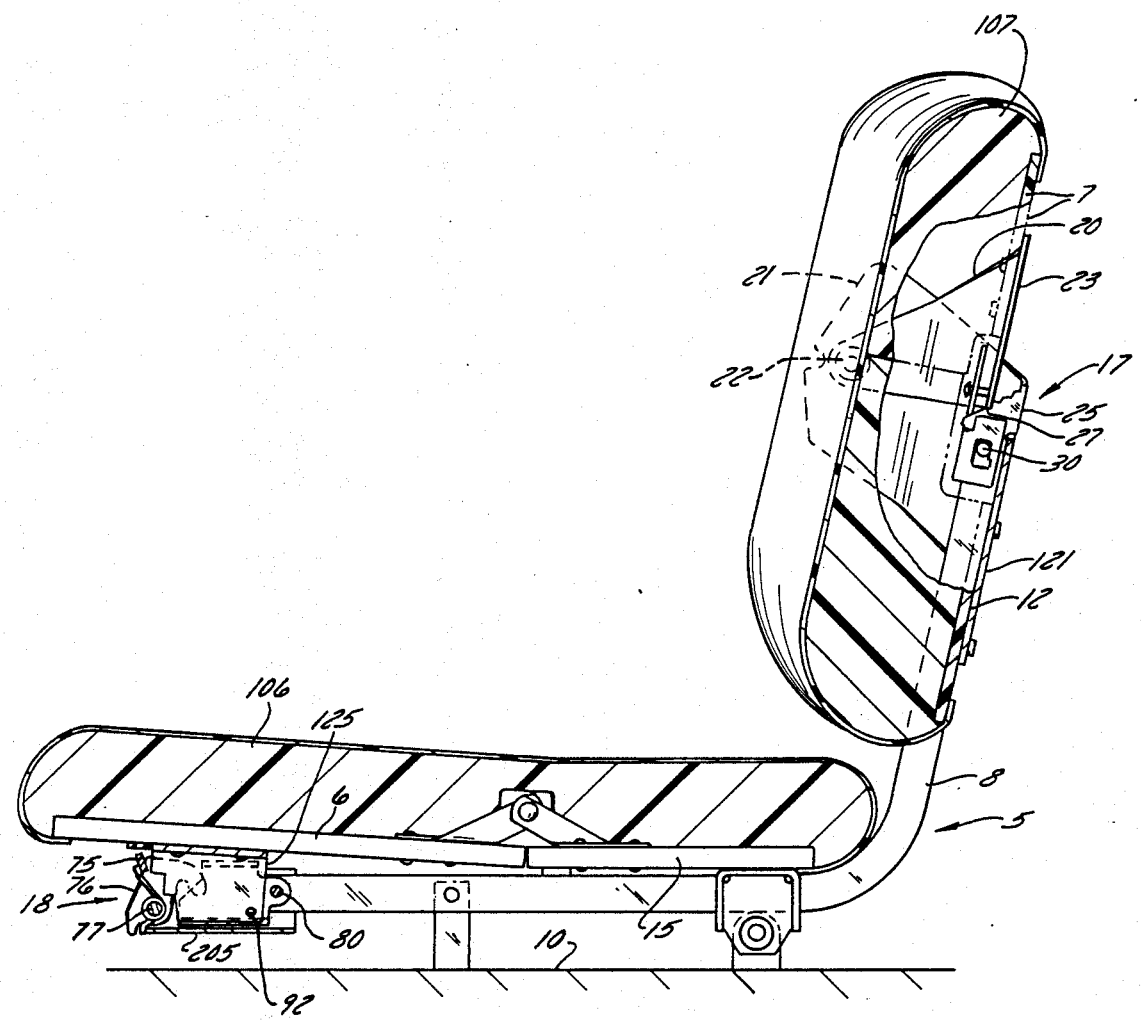
FIG. 1 is a view in vertical section through a vehicle seat having a tiltable seat pan element that is controlled by an adjustment means which embodies the present invention in one form and having a fore-and-aft tiltable back rest element that is controlled by another embodiment of the invention.
Figure 7:
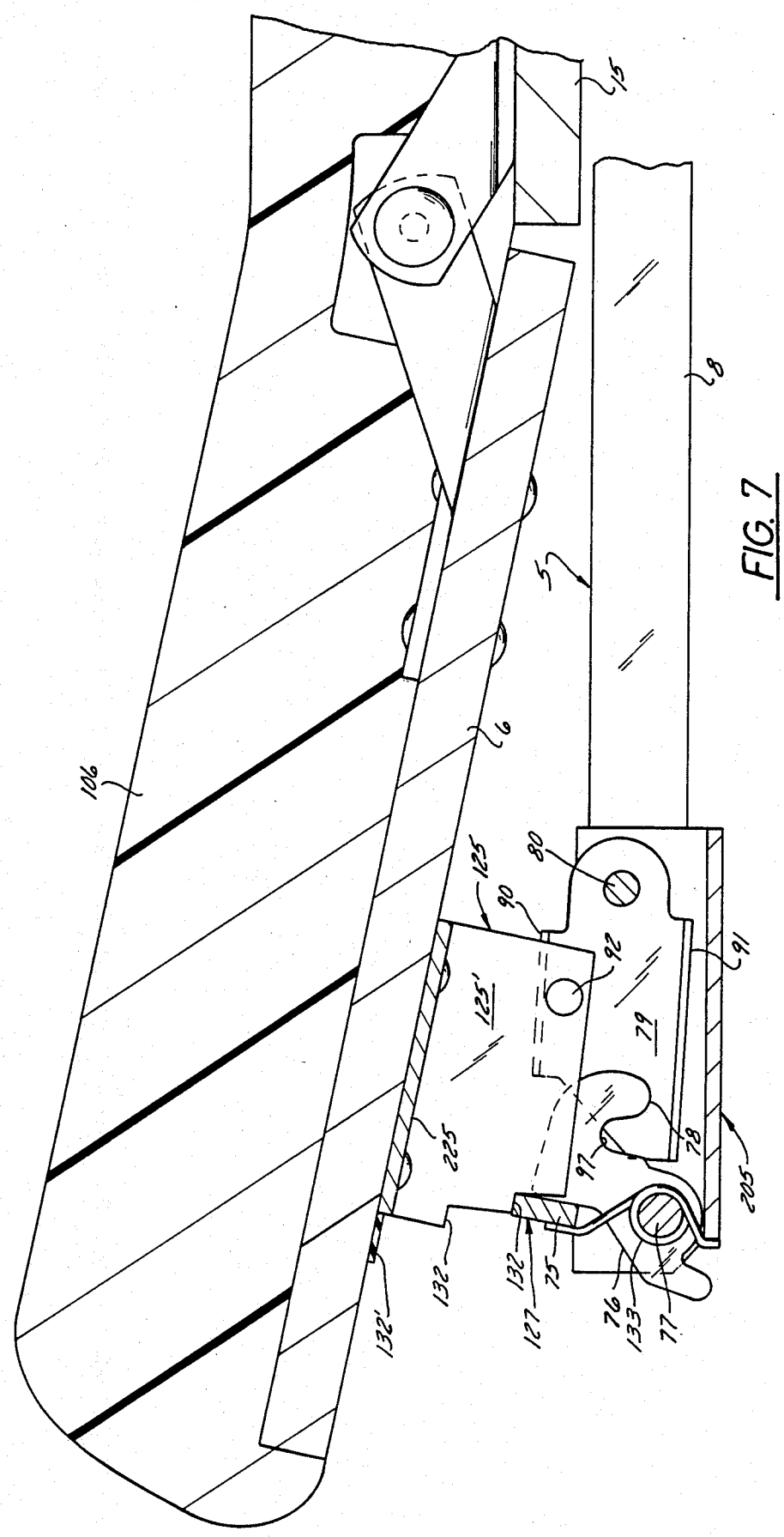
FIG. 7 is a fragmentary view in vertical section through the adjustable thigh support and its adjustment means, showing the tiltable seat pan element in its highest position of adjustment.

The vehicle seat illustrated in FIG. 1 has a frame element 5 which can be regarded as relatively stationary and has a pair of adjustable seat elements, namely, a seat pan element 6 and a back rest element 7, that are movable relative to the frame element.

The frame element 5 comprises a pair of L-shaped tubes 8 of preferably square cross-section that are rigidly connected in more or less parallel relationship by means of transverse struts described hereinafter. It will be understood that the frame element 5 is mounted on a pedestal-like support 10, which may comprise a shock mount, and it may be so connected with that support as to provide for its translatory adjustment heightwise and fore-and-aft, so that the seat can be positioned to suit the occupant's convenience.

In this case the back rest is in two parts, namely a lower back rest part 12, which is fixed to the frame element, and the adjustable back rest element 7, which constitutes the upper part of the back rest and is adjustingly tiltable fore-and-aft relative to the frame element, being swingable about a laterally extending axis that is near the top edge of the relatively fixed lower part 12. Similarly, the seat pan is in two parts, namely a rear part 15 which is fixed to the frame element and the adjustable front element 6 which constitutes a thigh support that is swingable about a laterally extending axis intermediate the front and rear edges of the seat pan. A soft and resilient cushion 107 covers the two parts 7 and 12 of the back rest and a similar cushion 106 covers the two parts 6 and 15 of the seat pan.

The adjustment means of this invention is embodied in one form in a self-releasing ratchet mechanism 17 that controls the attitude of the tiltable back rest element 7 and is embodied in another form in a generally similar mechanism 18 that controls the so-called rake attitude of the thigh-supporting element 6.

Turning first to the adjustable back rest element 7, it comprises an edgewise upright plate bent to a substantially U-shape to have forwardly projecting legs 20, each of which laterally inwardly overlies a forwardly projecting bracket plate 21 of the frame element. The bracket plate 21 can comprise the legs of a U-shaped piece, the bight portion 121 of which comprises a strut that bridges across the L-shaped tubes 8 and is fixed to them near their upper ends. Each leg 20 of the back rest element 7 has a pivot connection 22 to its adjacent bracket plate 21 to provide for the attitude adjustment of the back rest element. The pivots 22 are of course coaxial, and the tilting or swinging axis that they define for the U-shaped adjustable element 7 extends from side to side of the seat and is some distance forward from the substantially flat bight portion 23 of that element; hence that bight portion, in the course of its adjustment, has a combined tilting and edgewise up and down motion, as can be seen from a comparison of FIGS. 2, 3 and 4.

The position of attitude adjustment of the back rest element 7 is in this case controlled by a ratchet member 25 that is movably mounted on the upright leg of one of the L-shaped tubes 8 of the frame element, in cooperation with a pawl member 27 that comprises a part of the bottom edge of the bight portion 23 of the U-shaped back rest plate and is thus fixed to the adjustable seat element 7.

The ratchet member 25 is more or less H-shaped as seen from above, having a pair of flat, laterally spaced flanges 28 (FIG. 6) that project forwardly from a bridging web 29. The bottom portions of the flanges 28 flatwise overlie laterally opposite sides of the frame tube 8 near the upper end thereof, and are connected to it by means of a pin 30 which extends laterally through them and the frame tube to pivot the ratchet member for fore-and-aft swinging of its upper end portion. The front edge of each flange 28, in the upper portion thereof, is formed as a series of upwardly and rearwardly stepped ratchet teeth 32, the teeth on the two flanges being laterally opposite one another and identical so that the two flanges can cooperate as a unit with the pawl member 27. It will be observed that the pin 30 mounts the ratchet member 25 for swinging of its toothed portion in ratcheting directions which are substantially transverse to the directions of adjusting motion of the adjustable element 7, and particularly of the portion of the latter that comprises the pawl member 27.

A coiled torsion spring 33 surrounding the pin 30 has end portions which respectively engage the frame element and the ratchet member 25, reacting between them to urge the toothed upper portion of the ratchet member forwardly for ratcheting cooperation with the pawl member 27. As the back rest element 7 is swung in the upward-forward direction about the pivots 22, the pawl member 27 thereon is carried into engagement with one after another of the step-like teeth 32 on the ratchet member, each of which defines a position of adjustment of that element, holding it against movement in the downward-rearward direction in which it is normally urged by a seat occupant's engagement against it.

From its position of adjustment defined by the uppermost tooth or step 32 on the ratchet member, the back rest element 7 is movable slightly further in the upward-forward direction to an upper limit or releasing position (FIG. 4) at which a latch member 35 engages the ratchet member and swings it rearward against the bias of the spring 33, bringing the ratchet member to a disengaged position in which it is well clear of the pawl member 27 so that the adjustable element 7 can move substantially freely downwardly-rearwardly to an opposite or lower limit defined by the lowermost step 32 on the ratchet member.

The latch member 35, as best seen in FIG. 6, is substantially channel-shaped, having a pair of flat wings 36 that project edgewise rearward from a web portion 37. The latch member 35 is, as a whole, symmetrical to an upright plane that is midway between its wings 36 and parallel to them. The web 37 of the latch member has a wide lower portion 38 which bridgingly connects its wings 36 and has a substantially longer and narrower tongue-like upper portion 39 which projects up between the flanges 28 of the ratchet member and in which there is a lengthwise elongated hole 40. The narrower upper portion 39 of the web is flanked by upwardly facing shoulders 41 defined by top edges on its wider lower portion. The wings 36, which outwardly flatwise overlie the flanges 28 of the ratchet member, project above the level of the shoulders 41, but their top edges 49 are substantially below the level of the top of the tongue-like portion 39.

The latch member 35 is carried by the frame element 5 for motion relative to it substantially in the adjustment directions (i.e., up and down) between a defined latching position shown in FIG. 4 and a defined release position shown in FIGS. 2 and 3. For such motion the latch member is connected to the frame element by means of the same pin 30 that pivots the ratchet member, extending through a vertically elongated slot 43 in each latch member wing 36. Clips 44 or the like on the ends of the pin 30 overlie the wings 36 to prevent endwise displacement of the pin. The latch member is confined to very limited swinging about the pin 30 by the front surface of the tube 8, which the web portion 37 of the latch member overlies with some clearance.

For latching cooperation between the latch member 35 and the ratchet member 25 the front edge of each flange 28 of the ratchet member, at a level a small distance above the pin 30, is formed with a downwardly facing and forwardly projecting latching shoulder 46 from which a forwardly facing abutment shoulder 48 extends downward. The shoulders 46, 48 on the two flanges 28 of the ratchet member are of course identical and laterally opposite one another, and those flanges are so spaced apart that the latching shoulder 46 on each can be engaged by a respective one of the upwardly facing shoulders 41 on the latch member. Note that the shoulders 46, 48 on the ratchet member are spaced a substantial distance forward from the axis of the pin 30 about which the ratchet member swings.

For motion between its latching and release positions, the latch member 35 is actuated by a lost motion connection between it and the adjustable back rest element 7, which connection comprises the upper end of the hole 40 in the latch member and a stud 192 that is fixed on the bight portion 23 of the back rest element 7 and projects forwardly from it through the hole 40. When the back rest element 7 is in its uppermost position of adjustment (FIG. 3), defined by the top ratchet tooth 32, the stud 192 is at or very close to the upper end of the hole 40, and the shoulders 41 on the latch member are engaged with, or are very close to, the latching shoulders 46 on the ratchet member. As the back rest element 7 is swung beyond that position, the stud 192, in its engagement against the upper end of the hole 40, raises the latch member 35, which in turn swings the ratchet member 25 rearward away from the pawl member 27, owing to the engagement of the upwardly facing latch member shoulders 41 against the downwardly facing latching shoulders 46 on the ratchet member. The limit of upward movement of the latch member 35 is defined by the pin 30 in its engagement with the bottom ends of the vertically elongated slots 43 in the latch member wings. At that limit the latch member holds the ratchet member 25 well clear of the pawl member 27, and the forward biasing force that the spring 33 applies to the ratchet member is imposed upon the latch member through the forwardly facing abutment shoulders 48 on the ratchet member, engaging against the rear face of the latch member web portion 38.

Attention is now directed to a rearward extension or recess 143 at the bottom of the slot 43 in each wing of the latch member. When the latch member reaches the top of its stroke, it moves forward slightly in response to the forward bias upon it as the pin 30 enters the recesses 143 with a detent action. In this position of the latch member it engages the pin 30 at sharp edged corners 243, one for each slot 43, defined for the slot by its rearward recess 143. The latch member tends to be maintained in its raised position by the detent engagement of the pin 30 in the recesses 143 and by friction between the pin 30 and the corners 243, supplemented by friction between the abutment shoulders 48 on the ratchet member and the rear face of the latch member web portion 38. Thus, under the bias of the spring 33 the latch member maintains the ratchet member in its rearward disengaged position while the ratchet member maintains the latch member in its raised latching position.

While the latch member and the ratchet member mutually hold each other in their respective latching and disengaged positions, the back rest element 7 is free to move downwardly-rearwardly. As it nears the lower limit of its range of adjustment motion, cooperating lost motion connections on it and on the latch member engage to drive the latch member back down to its release position. Such engagement preferably takes place between the bottom edge of the back rest element (i.e., the pawl member 27) and the top edges 49 on the latch member wings 36, but it could take place between the stud 192 and the bottom end of its hole 40 in the latch member tongue. The sharp edges 243 on the latch member engage the pin 30 at such locations on its cylindrical surface that the friction of this engagement can be overcome by downward force on the latch member whereby those edges are forced to slide around the pin. As the latch member descends to its release position, it passes out of engagement with the shoulders 46 and 48 on the ratchet member, allowing the latter, under the bias of the torsion spring 33, to snap forward and resume its ratcheting cooperation with the pawl member 27.

Turning now to the mechanism 18 for the adjustable thigh support element 6, it comprises a modified embodiment of the invention, having a ratchet member 125 that is fixed to the adjustable element, a pawl member 127 that is carried by the frame element 5 for limited movement relative to it, and a latch member 135 which is also carried by the frame element for limited movement relative to it and which has a lost motion connection with the adjustable element 6.

Figure 11:
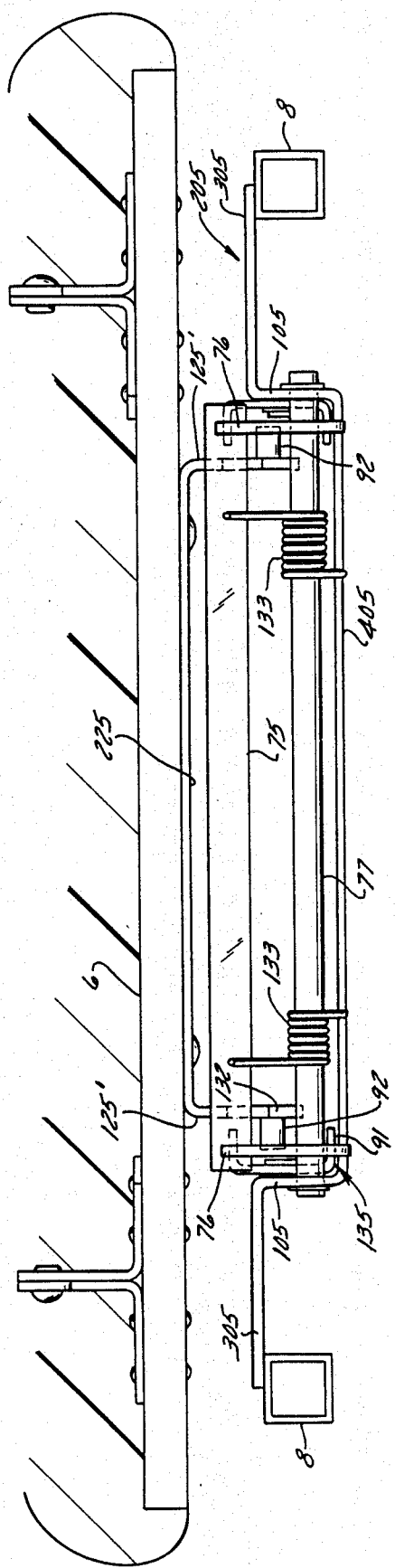
FIG. 11 is a front view of the seat pan element and its adjustment means.

In this case the ratchet member 125 is fixed to the underside of the thigh support and has step-like ratchet teeth 132 which are spaced apart around an arc concentric to the axis about which the thigh support swings for its adjustment. Each tooth 132 has a downwardly facing surface that is supportingly engaged by the pawl member 127 to define a position of adjustment of the thigh support. In this case, as shown in FIG. 9, the bottom surface of the thigh support element 7 serves in effect as a ratchet tooth that defines a lowermost position of its adjustment. To protect the relatively soft material of that structural element 7 from the effects of impacts against the hard pawl member 127, a strip 132' of resilient material is secured to the part of that surface that engages the pawl member and serves as the ratchet tooth. To avoid possible twisting deformation of the thigh support element, the ratchet member 125, as best seen in FIG. 11, preferably comprises a pair of identical laterally spaced apart ratchet plates 125' that comprise the downwardly bent end portions of a reinforcing plate 225 underlying the adjustable seat pan element 6. Each of the ratchet plates 125' is formed with the teeth 132, and both cooperate with a single pawl member 127.

The pawl member 127 comprises an elongated bar portion 75 of narrow substantially rectangular cross-section that extends lengthwise from side to side of the seat under the thigh support element. The pawl member further comprises a pair of connecting portions 76, fixed to the bar portion near its opposite ends and extending downward from it to swingably connect it to a rod 77 that is fixed to the frame element 5 and extends from side to side of the seat. The rod 77 (FIG. 11) preferably has its opposite ends secured in vertical portions 105 of an elongated strut 205 which has opposite coplanar end portions 305 that are welded to the respective tubes 8 and has a downwardly offset medial portion 405 that is beneath the rod 77 and is connected with the end portions 305 by the vertical portions 105. The rod 77 confines the bar portion 75 of the pawl member to forward and rearward swinging, transversely to the directions of adjustment of the thigh supporting seat element 6. At least one torsion spring 133, coiled around the rod 77 and reacting between the frame element 5 and the bar portion 75, biases the latter rearward for ratcheting engagement with the teeth of the ratchet member 125. As so engaged the rectangular-section bar portion 75 has its shorter width dimension oriented substantially horizontally to present a top supporting surface to the downwardly facing surfaces on the ratchet teeth.

At least one of the connecting portions 76 of the pawl member is formed for latching cooperation with the latch member 135, having a rearwardly projecting nose 78 that is spaced above and to the rear of the pawl member pivot axis defined by the rod 77. The latch member 135, which is adjacent to the connecting portion that has the nose 78, comprises a plate 79 which extends edgewise fore-and-aft and which has a pivot connection 80 with the frame element, about which it is swingable edgewise up and down. The pivot 80 is spaced some distance to the rear of the rod 77 and some distance forward from the axis about which the seat element 6 swings. Along the upper and lower edges of the plate 79 extend flanges 90, 91 that project laterally from it towards the adjacent ratchet plate to serve as abutments comprising a lost motion connection between the latch member and the adjustable seat element 6. The lost motion connection further comprises a stud 92 that is fixed on the adjacent ratchet plate and projects between the flanges 90, 91. The front end of the lower flange 91 is offset a substantial distance forwardly from the front end of the upper flange 90 for latching cooperation with the nose 78 on the pawl member.

Figure 10:
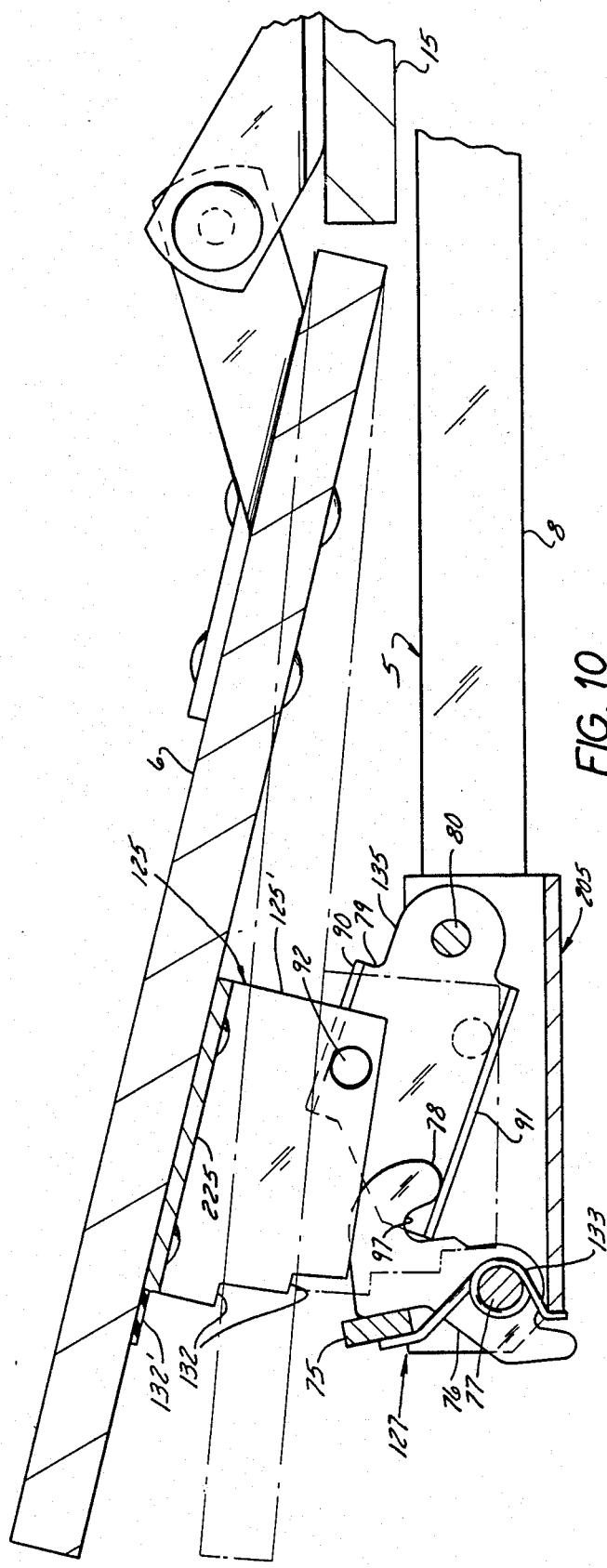
FIG. 10 is a view generally like FIGS. 8 and 9 but showing the latch member of the adjustment means in its latching position.

As the seat element 6 is raised from its highest position of adjustment defined by the ratchet teeth 132, the stud 92, by its engagement with the upper abutment flange 90, swings the latch member upward to its latching position. As this is taking place, the front end portion of the lower flange 91 on the latch member, engaging under the nose 78 on the pawl member, swings the latter forward to its disengaged position in which its bar portion 75 is clear of the ratchet teeth 132, as shown in FIG. 10. Downwardly adjacent to its nose 78, and partly defined by that nose, the pawl member has a concavely arcuate edge 97 against which transversely extending edges on the latch member, defined by the squared-off front end of its lower flange 91, are engaged when the latch member and the pawl member attain their respective latching and disengaged positions. By reason of the friction at this connection, the latch member and pawl member mutually hold each other in those positions under the influence of the torsion spring 133, while the adjustable seat element 6 moves freely down to its lowermost position of adjustment. In the final stages of downward movement of the seat element 6, the stud 92 engages the lower flange 91 on the latch member to drive the latch member to its release position, in which it is disengaged from the pawl member 127 and thus allows the latter to snap back to ratcheting cooperation with the ratchet member in response to the bias of the torsion spring 133.

From the foregoing description taken with the accompanying drawings, it will be apparent that this invention provides a self-releasing ratchet type adjustment means for an adjustable seat element that is particularly suitable for a vehicle seat, and especially one posing a requirement that the mechanism have utmost compactness in the directions of its adjusting motion.

What is claimed as the invention is:

1. In a seat comprising a relatively stationary frame element and a seat element which is swingable in opposite adjustment directions between a pair of defined limits about an adjustment axis that is fixed in relation to the frame element and which is normally urged in one of said directions by its support of an occupant of the seat, adjustment means comprising ratchet means consisting of a ratchet member cooperable with a pawl member for holding said seat element against swinging in said one direction out of each of a plurality of defined adjustment positions to which it can be swung in the opposite adjustment direction, and a latch member cooperating with said ratchet means to provide for substantially free swinging of the seat element in said one direction to one of said limits in consequence of its being swung in said opposite direction to the other of said limits, said adjustment means being characterized by:
   A. one of said members of the ratchet means being fixed to one of said elements;
   B. the other of said members of the ratchet means
      (1) being confined to movement relative to the other of said elements in opposite ratcheting directions towards and from said one member that are substantially transverse to said adjustment directions, and
      (2) being biased in the ratcheting direction towards said one member for ratcheting engagement with it; and
   C. said latch member being carried by said other of said elements and confined to motion relative thereto in substantially said adjustment directions between defined latching and release positions;
   D. said latch member having means fixed thereon defining a first pair of abutments and said one of said elements having means fixed thereon defining a second pair of abutments, said abutments of each pair being arranged to cooperate with those of the other pair in defining a lost motion connection between said latch member and said one of said elements whereby the latch member is moved to a release position and to a latching position, respectively, by movement of the seat element to its said one limit and to its said other limit;
   E. said latch member and said other member of the ratchet means having cooperating driving surfaces
      (1) which are spaced apart when the latch member is in its release position,
      (2) which are engaged during motion of the latch member to its latching position, and
      (3) through which the latch member by that motion drives said other member of the ratchet means to a disabled position in which it is spaced from said one member of the ratchet means; and
   F. cooperating latch member restraining means on said latch member and on a part carried by said other of said elements, said latch member restraining means being arranged
      (1) to be disengaged when the latch member is out of its latching position, but
      (2) to be engaged under the bias of said other member of the ratcheting means when the latch member is in its latching position, and
      (3) when engaged to releasably restrain the latch member against movement out of its latching position while the latch member retains said other member of the ratcheting means in its disabled position.

2. The seat of claim 1 wherein said adjustment means is further characterized by:
   (1) a shaft on said other of said elements providing a connection between it and said other member of the ratchet means and defining a ratcheting axis which is parallel to said adjustment axis and about which that other member is swingable in said ratcheting directions; and
   (2) a coiled torsion spring surrounding said shaft and reacting between said other of said elements and said other member of the ratchet means to bias the latter towards ratcheting engagement with said one member of the ratchet means.

3. The seat of claim 1 wherein said part comprises said other member of the ratchet means and wherein said latch member restraining means provides for frictional engagement between the latch member and said other member of the ratchet means and comprises:
   (1) a concavely curved edge surface portion on one of the two last mentioned members that is continuous with the driving surface thereon and faces towards the other of those two members, and
   (2) at least one edge on said other of the two last mentioned members that extends transversely to the direction of curvature of said edge surface portion and is arranged to frictionally engage the same.

4. The seat of claim 1 wherein said part comprises a pin on said other element by which said other member of the ratchet means is confined to swinging motions towards and from its disabled position and wherein said latch member restraining means provides for detent restraint of the latch member in its latching position and comprises:
   (1) a slot in said latch member which is elongated in substantially said adjustment directions and which cooperates with said pin to confine the latch member to substantially translatory motion between its latching and release positions and
   (2) a recess in the latch member which opens laterally from said slot and in which said pin makes detent engagement as the latch member arrives at its latching position.

* * * * *